United States Patent
Zou et al.

(10) Patent No.: US 9,251,344 B2
(45) Date of Patent: Feb. 2, 2016

(54) METHOD, DEVICE AND STORAGE MEDIUM FOR PROCESSING VIRUS

(71) Applicant: TENCENT TECHNOLOGY (SHENZHEN) COMPANY LIMITED, Shenzhen (CN)

(72) Inventors: Ye Zou, Shenzhen (CN); Ru-Lan Lin, Shenzhen (CN); Wen-Liang Tang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 36 days.

(21) Appl. No.: 14/258,520

(22) Filed: Apr. 22, 2014

(65) Prior Publication Data

US 2014/0366138 A1    Dec. 11, 2014

Related U.S. Application Data

(63) Continuation of application No. PCT/CN2014/070448, filed on Jan. 10, 2014.

(30) Foreign Application Priority Data

Jun. 9, 2013    (CN) .......................... 2013 1 0229821

(51) Int. Cl.
     *G06F 21/56*    (2013.01)
(52) U.S. Cl.
     CPC ...................................... *G06F 21/56* (2013.01)
(58) Field of Classification Search
     CPC ....................................................... G06F 21/56
     See application file for complete search history.

(56) References Cited

U.S. PATENT DOCUMENTS

| | | | |
|---|---|---|---|
| 6,886,099 B1 * | 4/2005 | Smithson et al. | 726/24 |
| 7,076,650 B1 * | 7/2006 | Sonnenberg | 713/151 |
| 7,836,504 B2 * | 11/2010 | Ray et al. | 726/24 |
| 8,171,552 B1 * | 5/2012 | Chang | 726/24 |
| 8,375,451 B1 * | 2/2013 | Andruss et al. | 726/24 |
| 2006/0037079 A1 * | 2/2006 | Midgley | 726/24 |

OTHER PUBLICATIONS

McAfee, McAfee Virusscan Enterprise 8.88 software, Apr. 27, 2010.*

* cited by examiner

*Primary Examiner* — Kambiz Zand
*Assistant Examiner* — Thanh Le
(74) *Attorney, Agent, or Firm* — WPAT, PC; Justin King (57) ABSTRACT

The present disclosure relates to a method, a device and a storage medium for processing virus which can automatically distinguish which of processing mode is best for the current status of the electronic apparatus. The method includes: detecting a virus scan operation; in response to the virus scan operation, determining whether conditions (i) and (ii) are true, wherein the condition (i) is true when a time interval between a last time of processing virus using a first virus processing mode and the current time is larger than a preset interval, the condition (ii) is true when at least one of risk situations exist during a time period between the last time of processing virus using the first virus processing mode and the current time; if one of conditions (i) and (ii) being true, calling the first virus processing mode to scan files in the electronic apparatus.

21 Claims, 8 Drawing Sheets

METHOD, DEVICE AND STORAGE MEDIUM FOR PROCESSING VIRUS

CROSS-REFERENCE

This application is a U.S. continuation application under 35 U.S.C. §111(a) claiming priority under 35 U.S.C. §120 and 365(c) to International Application No. PCT/CN2014/070448 filed Jan. 10, 2014, which claims the priority benefit of Chinese Patent Application No. 201310229821.8, filed on Jun. 9, 2013, the contents of which are incorporated by reference herein in their entirety for all intended purposes.

FIELD OF THE INVENTION

The present disclosure relates to security technology, particularly relates to a method, a device and a storage medium for processing virus in an electronic apparatus.

BACKGROUND OF THE INVENTION

In recent years, with the rapid development of computers, smart phones and other electronic apparatus, the computer viruses are spreading at an alarming rate. The computer viruses usually have characteristics of destructive, replication and infectivity. Computers, smart phones and other electronic apparatus once being infected with the virus, usually present that files therein are added, deleted, or changed. These operations on files may result in a series of problems, such as program crashing, system crashing, or a remote control of the apparatus, user information stolen, and so on.

In order to protect the resources of the computer, smart phones and other electronic apparatus are not infected by the computer viruses, and to ensure the safe operation of electronic apparatus, the files in the electronic apparatuses are often needed to be scanned to find whether a file is infected. If there has an infected file, the infected file is usually isolated to protect or delete.

Conventional methods for processing viruses require users to manually select modes of processing the virus, such as comprehensive killing mode or fast killing mode, and then process the viruses according to the selected mode. However, users often do not exactly know which mode should be selected under the current status of the apparatus, and also do not know the location or directory of the files easy to be infected. Therefore, the spread of the virus and the damage to the apparatus can not be prevented in time.

SUMMARY OF THE INVENTION

The present disclosure is to provide a method, a device and a storage medium for processing virus in an electronic apparatus, which can automatically distinguish which of processing mode is best for the current status of the electronic apparatus and prevent the spread of the virus in time.

Technical solutions provided by embodiments of the present disclosure include:

A method for processing virus in electronic apparatus includes: detecting a virus scan operation; in response to the virus scan operation, determining whether conditions (i) and (ii) are true, wherein the condition (i) is true when a time interval between a last time of processing virus using a first virus processing mode and the current time is larger than a preset interval, the condition (ii) is true when at least one of risk situations exist during a time period between the last time of processing virus using the first virus processing mode and the current time; if one of conditions (i) and (ii) being true, calling the first virus processing mode to scan files in the electronic apparatus to obtain a scanning result.

A device for processing virus in an electronic apparatus includes: a detecting module, configured to detect a virus scan operation; a determining module, in response to the virus scan operation, the determining module being configured to determine whether conditions (i) and (ii) are true, wherein the condition (i) is true when a time interval between a last time of processing virus using a first virus processing mode and the current time is larger than a preset interval, the condition (ii) is true when at least one of risk situations exist during a time period between the last time of processing virus using the first virus processing mode and the current time; a first calling module, if one of conditions (i) and (ii) being true, the first calling module being configured to call the first virus processing mode to scan files in the electronic apparatus to obtain a scanning result.

A computer-readable storage medium storing instructions for processing virus in an electronic apparatus, the instructions includes: detecting a virus scan operation; in response to the virus scan operation, determining whether conditions (i) and (ii) are true, wherein the condition (i) is true when a time interval between a last time of processing virus using a first virus processing mode and the current time is larger than a preset interval, the condition (ii) is true when at least one of risk situations exist during a time period between the last time of processing virus using the first virus processing mode and the current time; if one of conditions (i) and (ii) being true, calling the first virus processing mode to scan files in the electronic apparatus to obtain a scanning result.

In accordance with the method, device and storage medium for processing virus in an electronic apparatus, when the electronic apparatus detects a virus scan operation, whether a time interval between a last time of processing virus using a first virus processing mode and the current time is larger than a preset interval (condition (i)), and whether a risk situation exists during a time period between the last time of processing virus using the first virus processing mode and the current time (condition (ii)), are determined. If at least one of conditions (i) and (ii) is true, the first virus processing mode is called to scan files in the electronic apparatus, generate a scanning result, and process the infected files according to the scanning result. The method provided in the present disclosure can automatically distinguish which of processing mode is best for the current status of the electronic apparatus and prevent the spread of the virus in time.

Other features and advantages of the present disclosure will immediately be recognized by persons of ordinary skill in the art with reference to the attached drawings and detailed description of exemplary embodiments as given below.

DETAILED DESCRIPTION OF PREFERRED EMBODIMENTS

Various embodiments of the disclosure are discussed in detail below. While specific implementations are discussed, it should be understood that this is done for illustration purposes only. A person skilled in the art will recognize that other components and configurations may be used without parting from the spirit and scope of the disclosure.

The present disclosure provides a method, a device and a storage medium for processing viruses in electronic apparatuses.

The electronic apparatuses in the present disclosure, such as desktop computers, notebook computers, smart phones, personal digital assistants, tablet PCs, etc., may install/run one or more smart operating system inside.

Figure 1:
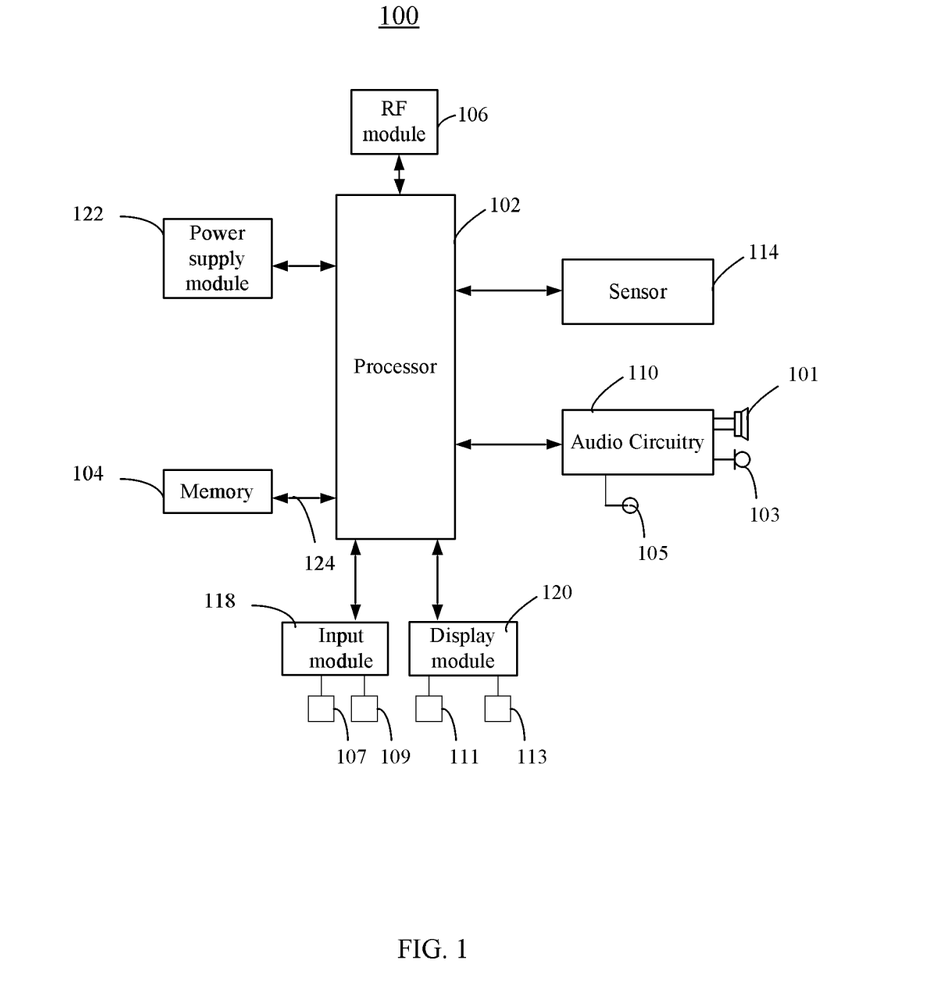
FIG. 1 is a block diagram of an embodiment of electronic apparatus.

FIG. 1 illustrates an electronic apparatus embodiment in the present disclosure. Referring to FIG. 1, the electronic apparatus 100 includes one or more (only one in FIG. 1) processors 102, a memory 104, a Radio Frequency (RF) module 106, an Audio circuitry 110, a sensor 114, an input module 118, a display module 120, and a power supply module 122. A person skilled in the art will understand that the structure in FIG. 1 is shown for illustration purposes only, not limitations of the electronic apparatus 100. For example, the electronic apparatus 100 may also include more or less parts than FIG. 1 shows, or different configuration.

It can be understood by those skilled in the art that besides the processor 102, all other components are belong to peripheral. The processor 102 and the peripherals are coupled by many peripheral interfaces 124. Peripheral interfaces 124 may be implemented based on the following standards: Universal Asynchronous Receiver/Transmitter (UART), General Purpose Input Output (GPIO), Serial Peripheral Interface (SPI), Inter-Integrated Circuit (I2C), but not limited to the above standards. In some examples, the peripheral interfaces 124 may only include the bus; while in other examples, the peripheral interfaces 124 may also include other components, one or more controllers, for example, which may be a display controller for connecting a liquid crystal display panel or a storage controller for connecting storage. In addition, these controllers may also be separated from the peripheral interface 124, and integrated inside the processor 102 or the corresponding peripheral.

The memory 104 may be used to store software programs and modules, such as the program instructions/modules corresponding to the method and device of processing virus in an electronic apparatus in the various embodiments of the present disclosure. The processor 102 performs a variety of functions and data processing by running the software program and the module stored in the memory 104, which implements the above method of processing virus in the electronic apparatus in the various embodiments of the present disclosure. Memory 104 may include high-speed random access memory and nonvolatile memory, such as one or more magnetic storage devices, flash memory, or other non-volatile solid-state memory. In some examples, the memory 104 may further include a remote configured memory compared to the processor 102, which may be connected to the electronic apparatus 100 via the network. The network instances include but not limited to, the Internet, intranets, local area network, mobile communication network, and their combinations.

The RF module 106 is used for receiving and transmitting electromagnetic waves, implementing the conversion between electromagnetic waves and electronic signals, and communicating with the communication network or other devices. The RF module 106 may include a variety of existing circuit elements, which perform functions, such as antennas, RF transceivers, digital signal processors, encryption/decryption chips, the subscriber identity module (SIM) card, memory, etc. The RF module 106 can communicate with a variety of networks such as the Internet, intranets, wireless network and communicate to other devices via wireless network. The above wireless network may include a cellular telephone network, wireless local area network (LAN) or metropolitan area network (MAN). The above wireless network can use a variety of communications standards, protocols and technologies, including but not limited to Global System for Mobile Communication (GSM), Enhanced Data GSM Environment (EDGE), wideband code division multiple access (W-CDMA), Code division access (CDMA), time division multiple access (TDMA), Wireless, Fidelity (WiFi) (such as the American Institute of Electrical and Electronics Engineers Association standards IEEE 802.11a, IEEE 802.11b, IEEE802.11g, and/or IEEE 802.11n), Voice over internet protocol (VoIP), Worldwide Interoperability for Microwave Access (Wi-Max), other protocols used for mail, instant messaging and short message, as well as any other suitable communication protocol, even including the protocols which are not yet been developed currently.

The Audio circuitry 110, the speaker 101, the audio jack 103, the microphone 105 together provide the audio interface between the user and the electronic device 100. Specifically, the audio circuit 110 receives audio data from the processor 102, converts the audio data into an electrical signal, and transmits the signal to the speaker 101. The speaker 101 converts the electrical signals to sound waves which can be heard by human ears. The audio circuitry 110 also receives electronic signals from the microphone, converts electronic signals to audio data, and transmits the audio data to the processor 102 for further processing. The audio data may also be acquired from the memory 104 or the RF module 106, the transmission module 108. In addition, the audio data may also be stored in the memory 104 or transmitted by the RF module 106 and the transmission module 108.

Examples of sensor 114 include but not limited to: an optical sensor, an operating sensor, and other sensors. Specifically, the optical sensor may include an ambient light sensor and a proximity sensor. The ambient light sensor may sense ambient light and shade, and then some modules executed by the processor 102 may use the output of the ambient light sensor to automatically adjust the display output. The proximity sensor may turn off the display output when detect the electronic device 100 near the ear. As a kind of motion sensor, gravity sensor may detect the value of acceleration in each direction, and the value and direction of gravity when the gravity sensor keeps still, which can be used for applications to identify the phone posture (such as horizontal and vertical screen switching, related games, magnetometer posture calibration), and for vibration recognition related functions (such as pedometer, percussion), etc. The electronic device 100 may also include a gyroscope, a barometer, a hygrometer, a thermometer, and other sensors, which is not shown for the purpose of brevity.

The input unit 118 may be configured to receive the input character information, and to generate input by keyboard, mouse, joystick, optical or trackball signal related to user settings and function control. Specifically, the input unit 130 may include button 107 and touch surface 109. The buttons 107 for example, may include character buttons for inputting characters, and control buttons for triggering control function. The instances of the control buttons may include a "back to the main screen" button, a power on/off button, a camera button and so on. The touch surface 109 may collect user operation on or near it (for example, a user uses a finger, a stylus, and any other suitable object or attachment to operate on or near the touch surface 109), and drive the corresponding connecting device according to pre-defined program. Optionally, the touch surface 109 may include a touch detection device and a touch controller. The touch detection device detects users' touch position and a signal produced by the touch operation, and passes the signal to the touch controller. The touch controller receives touch information from the touch detection device, converts the touch information into contact coordinates, sends the contact coordinates to the processor 102, and receives and executes commands sent from the processor 102. In addition, the touch surface 109 may be implemented in resistive, capacitive, infrared, surface acoustic wave and other forms. Besides the touch surface 109, the input unit 118 may also include other input devices. The preceding other input devices include but not limited to, one or more physical keyboards, trackballs, mouse, joysticks, etc.

The display module 120 is configured to display the information input by users, the information provided to users, and a variety of graphical user interfaces of the electronic device 100. The graphical user interfaces may consist of graphics, text, icons, video, and any combination of them. In one example, the display module 120 includes a display panel 111. The display panel 111 may for example be a Liquid Crystal Display (LCD) panel, an Organic Light-Emitting Diode Display (OLED) panel, an Electro-Phoretic Display (EPD) panel and so on. Furthermore, the touch surface 109 may be on top of the display panel 111 as a whole. In other embodiments, the display module 120 may also include other types of display devices, such as a projection display device 113. Compared with the general display panel, the projection display device 113 needs to include a plurality of components for projection, such as a lens group.

The power supply module 122 is used to provide power for the processor 102 and other components. Specifically, the power supply module 122 may include a power management system, one or more power supplies (such as a battery or AC), a charging circuit, a power failure detection circuit, an inverter, a power status indicator, and any other components related to electricity generation, management and distribution within the electronic device 100.

Figure 2:
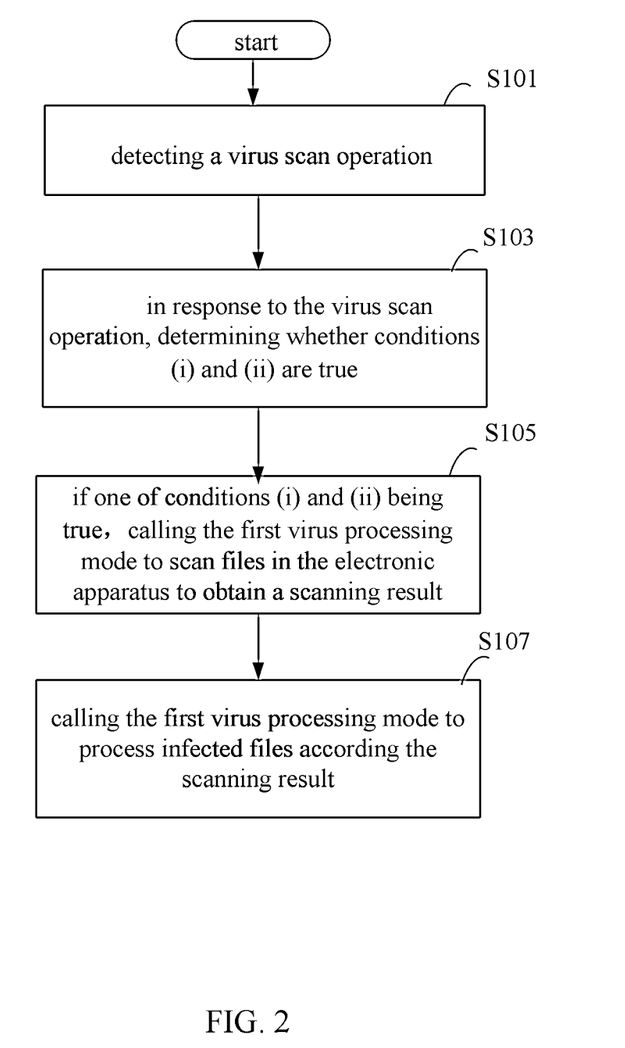
FIG. 2 is a flow chart of a method for processing virus in an electronic apparatus provided by one embodiment of the present disclosure.

Referring to FIG. 2, which is a flow chart of a method for processing virus in an electronic apparatus provided by one embodiment of the present disclosure. The method includes the following steps.

In Step 101, the electronic apparatus detects a virus scan operation.

Figure 3:
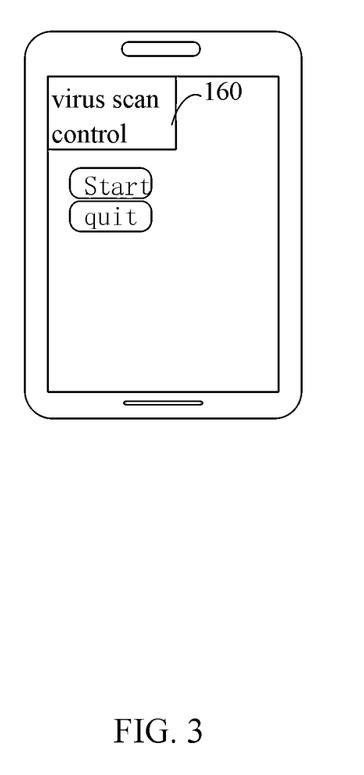
FIG. 3 is a schematic illustration of a virus scan control in accordance with the method of FIG. 2.

Virus scanning device can display a virus scan controls on the display of the electronic apparatus. Appearance of a virus scan control 160 may refer to FIG. 3. Virus scanning device can also detect a virus scan operation on the screen. The virus scan operation can be user-finger touch operation on the display location corresponding to virus scan controls.

In Step 103, once detecting the virus scan operation, the electronic apparatus determines whether at least one of conditions (i) and (ii) is true. The condition (i) is true when a time interval between a last time of processing virus using a first virus processing mode and the current time is larger than a preset interval. The condition (ii) is true when a risk situation exists during a time period between the last time of processing virus using the first virus processing mode and the current time.

In the exemplary embodiment, the first virus processing mode of processing virus may use comprehensive killing mode. The comprehensive killing mode is a mode of fully scanning the electronic apparatus (such as computers, cell phones, etc.) in each file, i.e. fully scanning all of the files in the disc and memory of the electronic apparatus. In the process of scanning, the data in the files are compared with the virus signature information in the virus database, to determine whether a file is infected. If the data in the file matches the virus signature information in the virus database, it is determined that this file is infected. Because the scanning process of the comprehensive killing mode is relatively detailed, the comprehensive killing mode is also relatively more time-consuming, and often takes up a lot of system resources.

In the exemplary embodiment, the last time of processing virus using the first virus processing mode may be a start time or an end time of processing virus using the first virus processing mode. The preset internal may be set according to the actual needs of any value, such as 10 days and so on.

The risk situations may include, but not limited to: 1). during the time period between the last time of processing virus using the first virus processing mode and the current time, the first virus processing mode of processing virus is never used; 2). during the time period between the last time of processing virus using the first virus processing mode and the current time, a database of virus has been updated, but no virus processing operation is detected; 3). during the time period between the last time of processing virus using the first virus processing mode and the current time, at least one risk site is visited via a browser or a client; and 4). the current time is in the peak of virus outbreak.

Time of processing virus (including the time of using the first virus processing mode, or the second mode of processing the virus) may be advanced record and stored in the electronic apparatus. Whether the risk situation 1) exists during the time period, may be determined by detecting whether the time of using the first virus processing mode of processing the virus during the time period is stored. If yes, it can be determined that the risk situation 1) exists. If not, it can be determined that the risk situation 1) doesn't exist.

Virus database updating can be performed by network upgrade. The virus database will be updated to include new virus signature information therein. The time of virus database updating may be advanced record and stored in the electronic apparatus. Whether the risk situation 2) exists during the time period, may be determined by detecting whether the time of virus database updating during the time period is stored. If yes, then detecting whether the time of processing virus during the time period is stored. If yes, it can be determined that the risk situation 2) doesn't exist. If not, it can be determined that the risk situation 2) exists.

Risk sites can also be set by the user in advance according to actual needs. Whether the risk situation 3) exists during the time period, may be determined by comparing the sites accessed by the user during the time period and the risk sites set by the user. The sites accessed by the user through a browser or a client during the time period can be obtained from the browser cookie records, or the site stored in history records. If the site accessed and pre-set risk site matches in the time period, it can be determined that the risk situation 3) exists.

The peak of the virus outbreak of an objective environment may be an objective environment, in which a virus is prevalent. The virus peak time or virus time period of the virus outbreak can be advanced stored in the electronic apparatus. Whether the risk situation 4) exists, may be determined by comparing the current time and the virus peak time and virus time period of the virus outbreak stored in advance. If the current time matches the virus peak time or the virus time period, it can be determined that the risk situation 4) exists.

In Step 105, if at least one of conditions (i) and (ii) is true, the first virus processing mode is called to scan files in the electronic apparatus to obtain a scanning result.

Different mode of processing virus may correspond to a different scanning range. For example, the first virus processing mode may correspond to scan all of the files in the electronic apparatus, and the second mode may correspond to scan part of the files in the electronic apparatus. Of course, in the present disclosure, the scanning range of different mode may be set according to the actual needs in advance.

In Step 105, the files to be scanned can be determined by the scanning range corresponds to the first virus processing mode. If the first virus processing mode corresponds to scan all of the files in the electronic apparatus, once the first virus processing mode is called, all of the files in the electronic will be scanned.

Specifically, the step of calling the first virus processing mode to scan the files in the electronic apparatus includes: obtaining virus signature information in the virus database, scanning the files and comparing data in the files with the virus signature information, determining whether the file is infected according to the comparing result, and generating a scanning result. If the data of the file matches the virus signature information in the virus database, the file is determined to be infected.

The scanning result may include name of the infected file or files, path of the infected file or files, virus type and viral description, and so on. The virus type may include system virus, worm virus, Trojan horse virus, hacker virus, script virus, etc.

In alternative embodiments, the conditions may further include iii). the number of risk situations is larger than a preset value. Thus, in Step 103, may include: whether at least one of conditions (i) to (iii) is true. Wherein, the preset value may be set according to the actual needs of any value, such as 0, 1, 2 and so on. Correspondingly, in the alternative embodiments, in Step 105, if at least one of conditions (i), (ii) and (iii) is true, the first virus processing mode is called to scan files in the electronic apparatus to obtain a scanning result.

The method may further include Step 107 after the Step 105. In Step 107, the infected files are processed by the first virus processing mode according to the scanning result.

The step of processing the infected files according to the scanning result may include: processing the infected files of different virus types according the corresponding processing rules, such as repairing infected files, deleting the infected file, or prohibiting the operation of infected files, etc. The step of processing the infected files according to the scanning result may further include: obtaining a processing result, such as in the infected files, which files are repaired, which files are deleted, and which files are prohibited.

In addition, the scanning result and the processing result can be displayed on the electronic apparatus via a window, to notice and alert users.

In the method for processing virus provided in the present embodiment, when the electronic apparatus detects a virus scan operation, whether a time interval between a last time of processing virus using a first virus processing mode and the current time is larger than a preset interval (condition (i)), and whether a risk situation exists during a time period between the last time of processing virus using the first virus processing mode and the current time (condition (ii)), are determined. If at least one of conditions (i) and (ii) is true, the first virus processing mode is called to scan files in the electronic apparatus, generate a scanning result, and process the infected files according to the scanning result. The method provided in the present disclosure can automatically distinguish which of processing mode is best for the current status of the electronic apparatus and prevent the spread of the virus in time.

Figure 4:
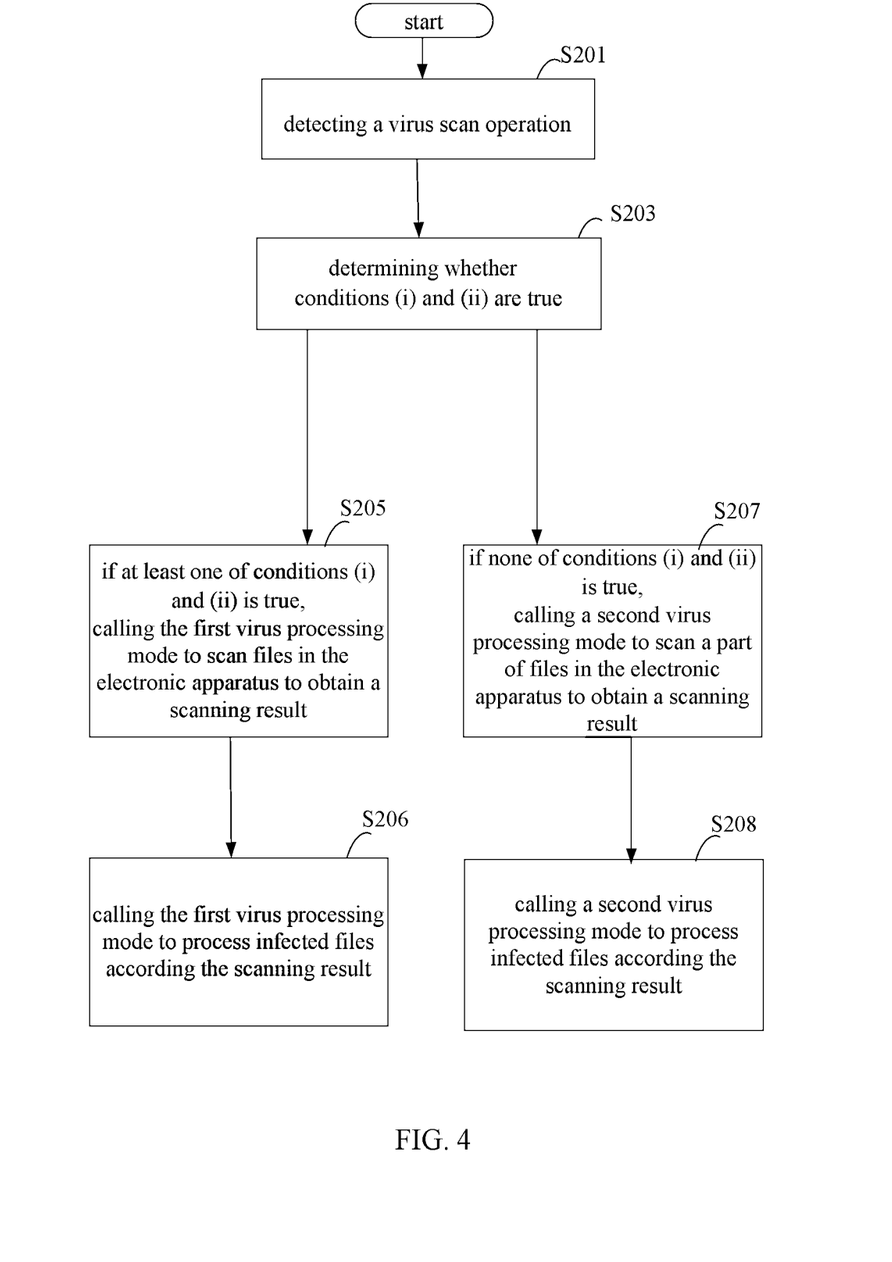
FIG. 4 is a flow chart of a method for processing virus in an electronic apparatus provided by another embodiment of the present disclosure.

Referring to FIG. 4, which is a flow chart of a method for processing virus in an electronic apparatus provided by another embodiment of the present disclosure. The method includes the following steps:

In Step 201, the electronic apparatus detects a virus scan operation.

In Step 203, once detecting the virus scan operation, the electronic apparatus determines whether at least one of conditions (i) and (ii) is true. The condition (i) is true when a time interval between a last time of processing virus using a first virus processing mode and the current time is larger than a preset interval. The condition (ii) is true when a risk situation exists during a time period between the last time of processing virus using the first virus processing mode and the current time.

In Step 205, if at least one of conditions (i) and (ii) is true, the first virus processing mode is called to scan files in the electronic apparatus, and generate a scanning result.

The method may further include Step 206 after the Step 205. In Step 206, the infected files are processed by the first virus processing mode according to the scanning result.

In this embodiment, the method further includes following steps.

In Step 207, if none of conditions (i) and (ii) is true, the second mode is called to scan files in the electronic apparatus to obtain a scanning result.

The method may further include Step 208 after the Step 207. In Step 208, the infected files are processed by the second virus processing mode according to the scanning result.

In the exemplary embodiment, the second mode of processing virus may use fast killing mode. The fast killing mode is a mode of fast scanning preset files in the electronic device, such as files in the memory of the electronic apparatus, system boot items, and key directory of the system, or the like. Because in the fast killing mode, not all of the files are scanned, using the fast killing mode to process virus can reduce the chances of infection from viruses, improve processing efficiency and improve the user experience.

In alternative embodiments, the second mode of processing virus may use specify killing mode. In the specify killing mode, a directory tree of the system files including layers of file directory can be displayed for users to select layer by layer. The electronic apparatus can process the virus according to the users' selection.

In the method for processing virus provided in the present embodiment, when the electronic apparatus detects a virus scan operation, whether a time interval between a last time of processing virus using a first virus processing mode and the current time is larger than a preset interval (condition (i)), and whether a risk situation exists during a time period between the last time of processing virus using the first virus processing mode and the current time (condition (ii)), are determined. If at least one of conditions (i) and (ii) is true, the first virus processing mode is called to scan files in the electronic apparatus, generate a scanning result, and process the infected files according to the scanning result. If none of conditions (i) and (ii) is true, the second mode is called to scan files in the electronic apparatus, generate a scanning result, and process the infected files according to the scanning result. The method provided in the present disclosure can automatically distinguish which of processing mode is best for the current situation of the electronic apparatus and prevent the spread of the virus in time.

Figure 5:
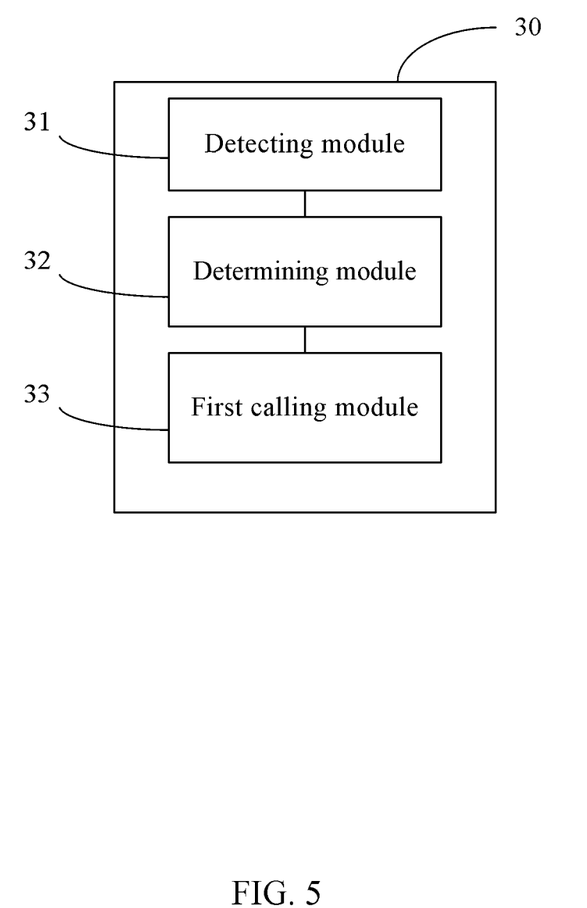
FIG. 5 is a block diagram of a device for processing virus in an electronic apparatus according to one embodiment of the present disclosure.
Figure 6:
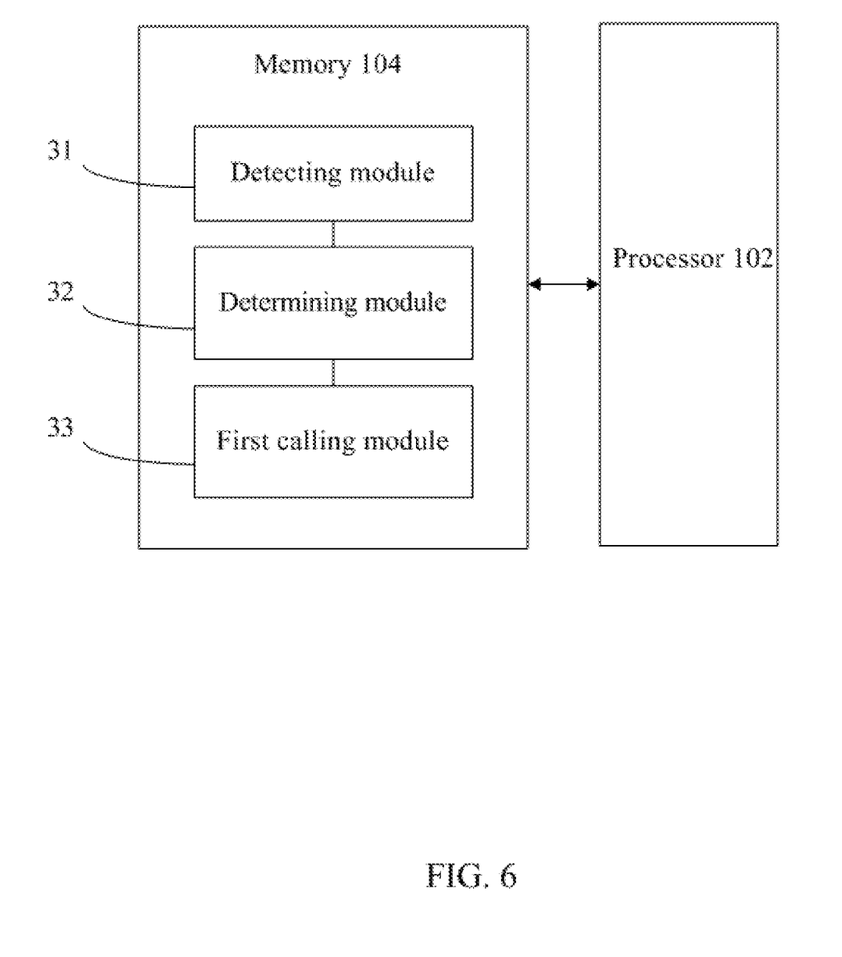
FIG. 6 is a schematic illustration of storage environment of the device illustrated in FIG. 5.

FIG. 5 is a block diagram of a device for processing virus in an electronic apparatus according to one embodiment of the present disclosure. Referring to FIG. 5, the device 30 may include a detecting module 31, a determining module 32, and a first calling module 33. The detecting module 31, the determining module 32, and the first calling module 33 may store in the memory 104, as shown in FIG. 6. The processor 102 in FIG. 6 is operated in conjunction with the memory 104.

The detecting module 31 is configured to detect a virus scan operation.

The determining module 32, in response to the virus scan operation, is configured to determine whether conditions (i) and (ii) are true. The condition (i) is true when a time interval between a last time of processing virus using a first virus processing mode and the current time is larger than a preset interval. The condition (ii) is true when at least one of risk situations exist during a time period between the last time of processing virus using the first virus processing mode and the current time.

The first calling module 33, if one of conditions (i) and (ii) being true, is configured to call the first virus processing mode to scan files in the electronic apparatus to obtain a scanning result. The first calling module 33 may further configured to call the first virus processing mode to process infected files according to the scanning result.

In addition, the first calling module 33 is configured to call the first virus processing mode to scan all of files in the electronic apparatus.

The risk situations may include, but not limited to: during the time period between the last time of processing virus using the first virus processing mode and the current time, the first virus processing mode of processing virus is never used; during the time period between the last time of processing virus using the first virus processing mode and the current time, a database of virus has been updated, but no virus processing operation is detected; during the time period between the last time of processing virus using the first virus processing mode and the current time, at least one risk site is visited via a browser or a client; and the current time is in the peak of virus outbreak, and so on.

In the device for processing virus provided in the present embodiment, when the detecting module detects a virus scan operation, whether a time interval between a last time of processing virus using a first virus processing mode and the current time is larger than a preset interval (condition (i)), and whether a risk situation exists during a time period between the last time of processing virus using the first virus processing mode and the current time (condition (ii)), are determined. If at least one of conditions (i) and (ii) is true, the first virus processing mode is called to scan files in the electronic apparatus to obtain a scanning result, and process the infected files according to the scanning result. The method provided in the present disclosure can automatically distinguish which of processing mode is best for the current situation of the electronic apparatus and prevent the spread of the virus in time.

Figure 7:
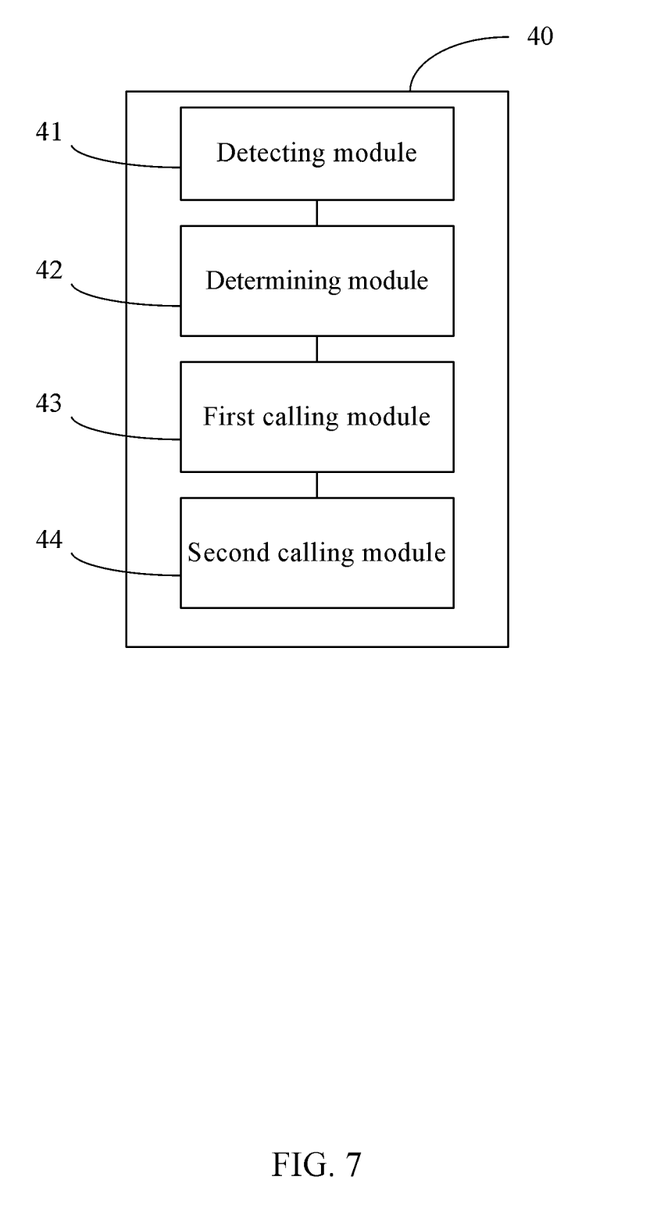
FIG. 7 is a block diagram of a device for processing virus in an electronic apparatus according to another embodiment of the present disclosure.
Figure 8:
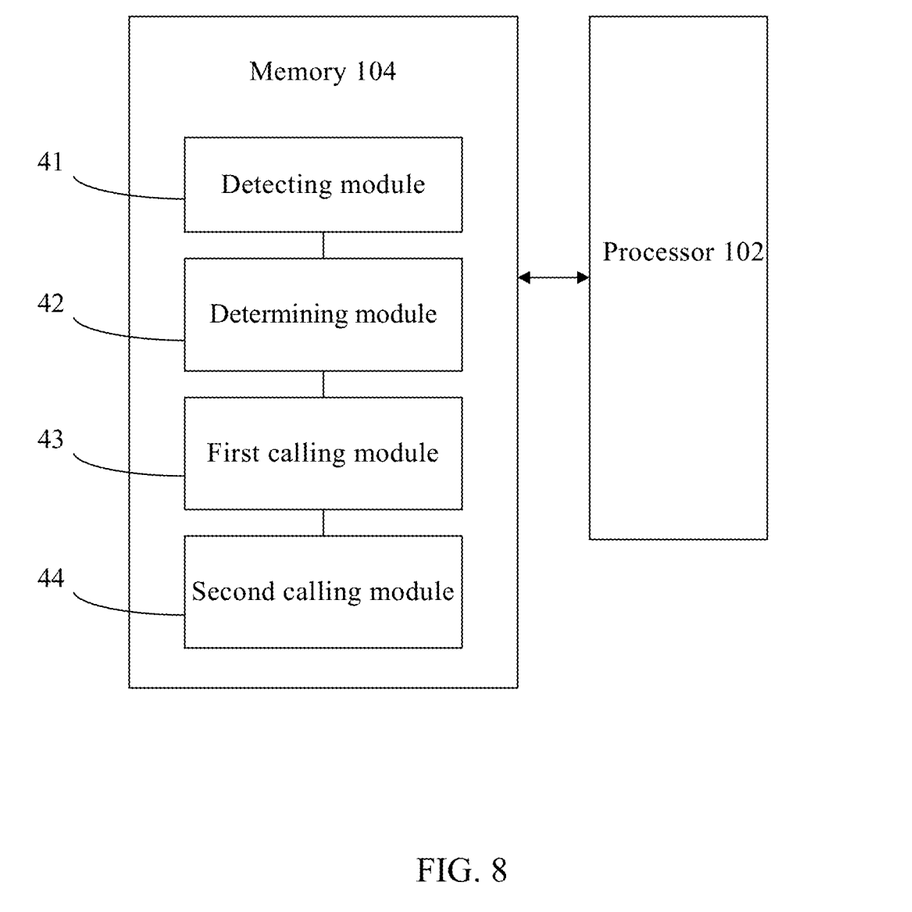
FIG. 8 is a schematic illustration of storage environment of the device illustrated in FIG. 7.

FIG. 7 is a block diagram of a device for processing virus in an electronic apparatus according to one embodiment of the present disclosure. Referring to FIG. 7, the device 40 may include a detecting module 41, a determining module 42, a first calling module 43 and a second calling module 44. The detecting module 41, the determining module 42, the first calling module 43 and the second calling module may store in the memory 104, as shown in FIG. 8. The processor 102 in FIG. 8 is operated in conjunction with the memory 104.

The detecting module 41 is configured to detect a virus scan operation.

The determining module 42, in response to the virus scan operation, is configured to determine whether conditions (i) and (ii) are true. The condition (i) is true when a time interval between a last time of processing virus using a first virus processing mode and the current time is larger than a preset interval. The condition (ii) is true when at least one of risk situations exist during a time period between the last time of processing virus using the first virus processing mode and the current time.

The first calling module 43, if one of conditions (i) and (ii) being true, is configured to call the first virus processing mode to scan files in the electronic apparatus to obtain a scanning result. The first calling module 43 may further configured to call the first virus processing mode to process infected files according to the scanning result.

The second calling module 44, if both conditions (i) and condition (ii) being false, is configured to call a second virus processing mode to scan a part of files in the electronic device to obtain a scanning result. The second calling module 44 may further configured to call the second virus processing mode to process infected files according to the scanning result.

In one embodiment, the part of files comprise the files in a memory of the electronic apparatus, system boot items in the electronic apparatus, or a directory of system of the electronic apparatus.

In alternative embodiments, the part of files comprises the files selected by users according to a directory tree of the system files including layers of file directory.

In the device for processing virus provided in the present embodiment, when the detecting module detects a virus scan operation, whether a time interval between a last time of processing virus using a first virus processing mode and the current time is larger than a preset interval (condition (i)), and whether a risk situation exists during a time period between the last time of processing virus using the first virus processing mode and the current time (condition (ii)), are determined. If at least one of conditions (i) and (ii) is true, the first virus processing mode is called to scan files in the electronic apparatus to obtain a scanning result, and process the infected files according to the scanning result. If none of conditions (i) and (ii) is true, the second mode is called to scan files in the electronic apparatus, generate a scanning result, and process the infected files according to the scanning result. The method provided in the present disclosure can automatically distinguish which of processing mode is best for the current situation of the electronic apparatus and prevent the spread of the virus in time.

What's more, various devices provided by the embodiments of the disclosure discussed above is done for illustration purposes only, and should not be taken as limitations of the general principles of the device for processing virus in electronic apparatus provided by the embodiment of the disclosure. It will be understood that various combinations and changes in the form and details of the device illustrated may be made by those skilled in the art without departing from the disclosure.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. A "tangible" computer-readable medium expressly excludes software per se (not stored on a tangible medium) and a wireless, air interface. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that performs particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps. Program modules may also comprise any tangible computer-readable medium in connection with the various hardware computer components disclosed herein, when operating to perform a particular function based on the instructions of the program contained in the medium.

The above descriptions are only preferred embodiments of the present disclosure, and are not intended to limit the present disclosure. Any amendments, replacement and modification made to the above embodiments under the spirit and principle of the present disclosure should be included in the scope of the present disclosure.

What is claimed is:

1. A method for processing virus in an electronic apparatus, the method comprising:
   detecting a virus scan operation;
   in response to the virus scan operation, determining whether conditions (i) and (ii) are true, wherein the condition (i) is true when a time interval between a last time of processing virus using a first virus processing mode and the current time is larger than a preset interval, the condition (ii) is true when at least one of risk situations exist during a time period between the last time of processing virus using the first virus processing mode and the current time, wherein the risk situations comprise:
   during the time period between the last time of processing virus using the first virus processing mode and the current time, the first virus processing mode of processing virus is never used,
   during the time period between the last time of processing virus using the first virus processing mode and the current time, a database of virus has been updated, but no virus processing operation is detected,
   during the time period between the last time of processing virus using the first virus processing mode and the current time, at least one risk site is visited via a browser or a client; or the current time is in the peak of virus outbreak; and
   if one of conditions (i) and (ii) being true, calling the first virus processing mode to scan files in the electronic apparatus to obtain a scanning result.

2. The method as claimed in claim 1, wherein, the step of calling the first virus processing mode to scan files in the electronic apparatus comprises calling the first virus processing mode to scan all of files in the electronic apparatus.

3. The method as claimed in claim 1, the method further comprising:
   if both conditions (i) and condition (ii) being false, calling a second virus processing mode to scan a part of files in the electronic device to obtain a scanning result.

4. The method as claimed in claim 3, wherein, the part of files comprise the files in a memory of the electronic apparatus, system boot items in the electronic apparatus, or a directory of system of the electronic apparatus.

5. The method as claimed in claim 3, wherein, the part of files comprise the files selected by users according to a directory tree of the system files including layers of file directory.

6. The method as claimed in claim 3, wherein, after the step of calling a second virus processing mode to scan a part of files in the electronic device to obtain a scanning result, the method further comprises:
   calling the second virus processing mode to process the infected files according to the scanning result.

7. The method as claimed in claim 1, wherein, after the step of calling the first virus processing mode to scan files in the electronic apparatus to obtain a scanning result, the method further comprises:
   calling the first virus processing mode to scan files in the electronic apparatus to obtain a scanning result.

8. A device for processing virus in an electronic apparatus, the device comprises at least a processor operating in conjunction with a memory and a plurality of modules, the plurality of modules comprise:
   a detecting module, configured to detect a virus scan operation;
   a determining module, in response to the virus scan operation, the determining module being configured to determine whether conditions (i) and (ii) are true, wherein the condition (i) is true when a time interval between a last time of processing virus using a first virus processing mode and the current time is larger than a preset interval, the condition (ii) is true when at least one of risk situations exist during a time period between the last time of processing virus using the first virus processing mode and the current time, wherein the risk situations comprise:
   during the time period between the last time of processing virus using the first virus processing mode and the current time, the first virus processing mode of processing virus is never used,
   during the time period between the last time of processing virus using the first virus processing mode and the current time, a database of virus has been updated, but no virus processing operation is detected,
   during the time period between the last time of processing virus using the first virus processing mode and the current time, at least one risk site is visited via a browser or a client; or the current time is in the peak of virus outbreak; and a first calling module, if one of conditions (i) and (ii) being true, the first calling module being configured to call the first virus processing mode to scan files in the electronic apparatus to obtain a scanning result.

9. The device as claimed in claim 8, wherein, the calling mode is configured to call the first virus processing mode to scan files in the electronic apparatus comprises calling the first virus processing mode to scan all of files in the electronic apparatus.

10. The device as claimed in claim 8, further comprising:
a second calling module, if both conditions (i) and condition (ii) being false, the second calling module is configured to call a second virus processing mode to scan a part of files in the electronic device to obtain a scanning result.

11. The device as claimed in claim 10, wherein, the part of files comprise the files in a memory of the electronic apparatus, system boot items in the electronic apparatus, or a directory of system of the electronic apparatus.

12. The device as claimed in claim 10, wherein, the part of files comprise the files selected by users according to a directory tree of the system files including layers of file directory.

13. The device as claimed in claim 10, wherein, the second calling module is further configured to call the second virus processing mode to process the infected files according to the scanning result.

14. The device as claimed in claim 8, wherein, the second calling module is further configured to call the first virus processing mode to scan files in the electronic apparatus to obtain a scanning result.

15. A non-transitory computer-readable storage medium storing instructions for starting an application in an electronic apparatus, the instructions comprising:
detecting a virus scan operation;
in response to the virus scan operation, determining whether conditions (i) and (ii) are true, wherein the condition (i) is true when a time interval between a last time of processing virus using a first virus processing mode and the current time is larger than a preset interval, the condition (ii) is true when at least one of risk situations exist during a time period between the last time of processing virus using the first virus processing mode and the current time, wherein the risk situations comprise:

during the time period between the last time of processing virus using the first virus processing mode and the current time, the first virus processing mode of processing virus is never used, during the time period between the last time of processing virus using the first virus processing mode and the current time, a database of virus has been updated, but no virus processing operation is detected, during the time period between the last time of processing virus using the first virus processing mode and the current time, at least one risk site is visited via a browser or a client; or the current time is in the peak of virus outbreak; and if one of conditions (i) and (ii) being true, calling the first virus processing mode to scan files in the electronic apparatus to obtain a scanning result.

16. The computer-readable storage medium as claimed in claim 15, wherein, the step of calling the first virus processing mode to scan files in the electronic apparatus comprises calling the first virus processing mode to scan all of files in the electronic apparatus.

17. The computer-readable storage medium as claimed in claim 15, the method further comprising:
if both conditions (i) and condition (ii) being false, calling a second virus processing mode to scan a part of files in the electronic device in the electronic device to obtain a scanning result.

18. The computer-readable storage medium as claimed in claim 17, wherein, the part of files comprise the files in a memory of the electronic apparatus, system boot items in the electronic apparatus, or a directory of system of the electronic apparatus.

19. The computer-readable storage medium as claimed in claim 17, wherein, the part of files comprise the files selected by users according to a directory tree of the system files including layers of file directory.

20. The computer-readable storage medium as claimed in claim 17, wherein, after the step of calling a second virus processing mode to scan a part of files in the electronic device to obtain a scanning result, the instructions further comprise:
calling the second virus processing mode to process the infected files according to the scanning result.

21. The computer-readable storage medium as claimed in claim 17, wherein, after the step of calling the first virus processing mode to scan files in the electronic apparatus to obtain a scanning result, the instructions further comprise:
calling the first virus processing mode to scan files in the electronic apparatus to obtain a scanning result.

* * * * *